July 15, 1930.  W. D. CROWELL  1,770,747

VENTILATING MEANS FOR VEHICLE BODIES

Filed Dec. 31, 1928

INVENTOR:
WILLIAM D. CROWELL.
BY Bakewell & Church
ATTORNEY.

Patented July 15, 1930

1,770,747

UNITED STATES PATENT OFFICE

WILLIAM D. CROWELL, OF ST. LOUIS, MISSOURI

VENTILATING MEANS FOR VEHICLE BODIES

Application filed December 31, 1928. Serial No. 329,405.

This invention relates to a ventilating means for vehicle bodies, of the general type described in my pending application for patent Serial No. 321,642, filed November 24, 1928.

The object of my present invention is to provide a vehicle ventilating device that embodies the good features and desirable characteristics of the ventilating means described in my said pending application for patent, but which is of slightly different construction.

The vehicle ventilating means that forms the subject-matter of my pending application previously referred to consists of a window or other kind of movable closure for an opening in the side wall of a vehicle body, constructed so that when it is in a partially open condition, an exhaust opening will be formed in said side wall through which air, gases and the like will be withdrawn from the interior of the body by the rush of air past said exhaust opening, without liability of air blowing into the body through said exhaust opening. My present invention consists of a side door for a vehicle body of the closed type, provided with a window that is composed of a plurality of vertically-divided sections, one of which is capable of being moved relatively to the door, so as to form a ventilating opening or exhaust opening of the kind previously mentioned. Preferably, the section of the window that is adapted to be adjusted or moved so as to produce the exhaust opening or ventilating opening, is mounted in such a way that it can be moved downwardly into a pocket in the door and arranged in various positions so as to vary the size of said opening.

Figure 1:
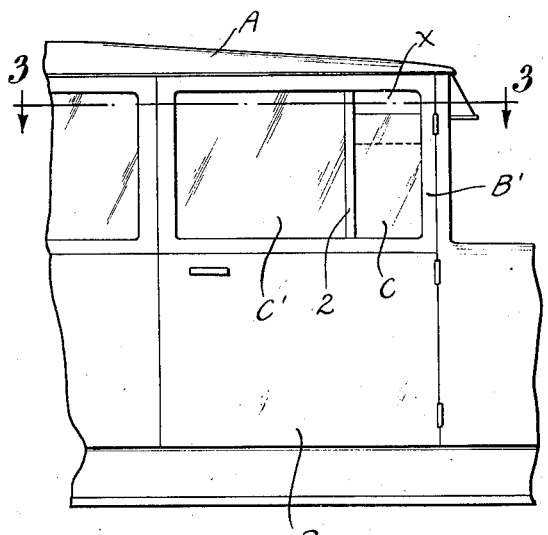

Figure 1 of the drawings is a side elevational view of a portion of an automobile body equipped with a ventilating device constructed in accordance with my present invention.

Figure 2:
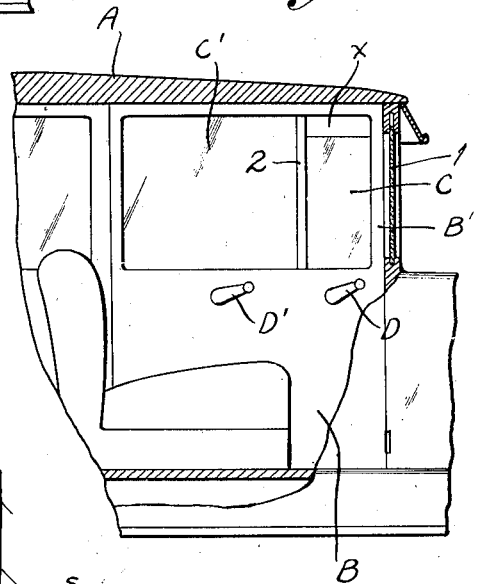
Figure 3:
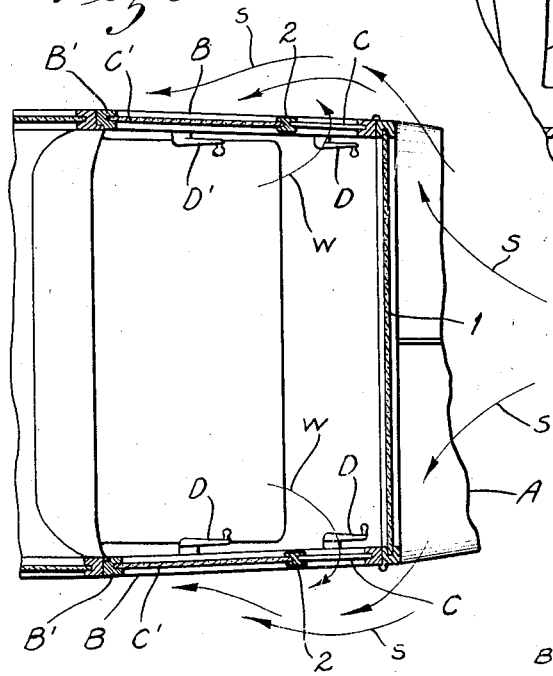

Figure 2 is a vertical longitudinal sectional view of the body, looking outwardly towards the side wall; and Figure 3 is a horizontal sectional view, taken on the line 3—3 of Figure 1.

Referring to the drawings which illustrate the preferred form of my invention, A designates a vehicle body, for example, an automobile body of the closed type, B designates a door in the side wall of said body and B' designates a window frame constituting the upper half of said door, the lower half of said door being constructed so as to serve as a window pocket. The window surrounded by the frame B' is composed of a plurality of vertically-divided sections, at least one of which is capable of being moved relatively to the door, so as to form a ventilating opening or exhaust opening through which air, gases, smoke and the like will be withdrawn from the interior of the vehicle body by the air that rushes rearwardly over the side wall when the vehicle is traveling forwardly.

In the form of my invention illustrated in Figures 1 to 3 the window in the door B is composed of two sections C and C' divided by a vertical joint, and each equipped with a conventional raising and lowering mechanism provided with operating handles D and D', as shown in Figure 2, so as to enable said sections to be moved downwardly and upwardly into and out of the window pocket in the lower portion of the door. If it is desired to completely open the window constituting the upper half of the door, both of the sections C and C' are lowered, and if it is desired to close the window but at the same time ventilate the body, the window section C' is moved upwardly into its fully closed position, as shown in Figures 1 and 2, and the window section C is arranged in a partially open position, so as to form a ventilating slot or exhaust opening $x$ between the top edge of said section C and the top member of the window frame B'.

In a vehicle body of the construction above described the interior of the body will be maintained in a properly vented condition when the vehicle is in motion, if the window sections C and C' are adjusted in the position shown in Figures 1 and 2, due to the fact that the currents of air, represented by the arrow $s$ in Figure 3, that strike against the front side of the wind shield 1 of the body and then escape laterally at the ends of said wind shield, will create a suction in flowing rearwardly across the exhaust openings x in the doors B that is of sufficient intensity to cause foul air, gases, smoke and the like to be withdrawn from the interior of the body through said exhaust openings x, as indicated by the arrows w in Figure 3. There is a natural tendency for the air currents to flow inwardly towards the side walls of the body, but such inwardly-flowing air currents are shunted off and prevented from entering the body of the window sections C' in the doors B, which, at such times, are in their closed or fully raised position, the window sections C being made of such width that the rearwardly-flowing air currents will jump the exhaust openings x before flowing inwardly towards the side walls, as clearly indicated by the arrows in Figure 3. While Figure 3 shows the doors B in the opposite side walls of the body, equipped with windows of the kind previously described, I wish it to be understood that it is immaterial, so far as my invention is concerned, whether only one or both of said doors are provided with such windows.

In a vehicle body equipped with a conventional one-piece window that extends across the entire width of the window opening, the slot that is produced between the top edge of the window and the top member of the window frame when the window is in a partially open condition, is so long that air will blow into the vehicle through the rear end portion of said slot when the vehicle is traveling forwardly, due to the natural tendency of the air currents to flow inwardly towards the side wall shortly after said air currents have passed the corner at the junction of the wind shield at the front end of the side wall. In my improved construction this cannot occur when the window in the door B is adjusted so as to ventilate the body, due, of course, to the fact that said window comprises one portion, to wit, the section C. that can be adjusted so as to form a relatively short ventilating slot or exhaust opening x at the top edge of said section, and a different portion, to wit, the section C', that can be adjusted so as to form in effect a solid portion of the side wall that is located at the rear end of the slot x.

Usually, each of the window sections C and C' will be formed from a sheet of relatively thick glass, and said sections will be arranged in the same vertical plane or in substantially abutting relationship with their adjacent vertical edges, slidingly mounted in a guiding device 2 of substantially H shape in horizontal cross section whose flanges embrace the adjacent edge portions of the sections C and C', as shown in Figure 3.

In the case of an automobile body whose side walls are provided with front and rear doors, said front and rear doors can, if desired, be equipped with windows of the kind previously described, but usually it will be found that the vehicle can be kept properly ventilated, if only one door of the vehicle, preferably, one of the front doors, is provided with a window comprising at least one vertically-adjustable section that can be moved into such a position as to form a ventilating slot or opening x of the kind previously mentioned.

Having thus described my invention, what I claim as new and desire to secure by Letters Patent is:

1. A vehicle body having a side door provided with a window composed of a plurality of vertically-divided sections, each of which is capable of being moved vertically independently of and relatively to the other section, the window section that is arranged nearest to the front edge of the door being adapted to be moved downwardly into a pocket in the door when the other section is in its raised or closed position, so as to produce an exhaust opening of the character described, located adjacent the top edge of the door.

2. A vehicle body provided with a side wall door whose upper portion is constructed so as to form a window frame and whose lower portion is constructed so as to form a window pocket, a window surrounded by said frame and composed of a plurality of vertically-divided sections, each of which is capable of being moved vertically independently of and relatively to the other section and a raising and lowering mechanism for the front section, by means of which said section can be lowered slightly into said pocket without disturbing the other section, so as to form an exhaust opening through which air, gases, smoke and the like will be withdrawn from the interior of the body by the rush of air rearwardly over the side wall of the body when the vehicle is traveling forwardly.

3. A vehicle body having a side door provided with a window composed of a plurality of vertically-divided sections, each of which is capable of being moved vertically independently of and relatively to the other section, a pocket in said door, and a raising and lowering mechanism combined with each of said window sections, the front window section that is located nearest the front edge of the door being adapted to be moved downwardly into said pocket into a partially open condition so as to form a ventilating or exhaust opening when the other section is in its raised or closed position.

4. In a vehicle body of the closed type, the combination of a side wall, a door in said side wall provided with a window composed of a plurality of vertically-divided sections arranged in the same vertical plane and each being capable of being moved vertically independently of and relative to the other, a window pocket in said door, and means for enabling the front window section to be moved downwardly into said pocket into a partially open condition when the other section is closed, so as to produce an exhaust opening of less width than the window through which air, gases and the like will be sucked out of the interior of the body by the rush of air rearwardly past said exhaust opening when the vehicle is in motion.

5. A side door for a vehicle body, having an upper portion constructed so as to serve as a window frame and a lower portion constructed so as to serve as a window pocket, a window in said frame composed of a plurality of vertically-divided sections that lie in the same vertical plane, a raising and lowering mechanism combined with each of said window sections whereby said sections may be lowered or raised independently of each other, into and out of said pocket, and a vertically-disposed guiding device on the door interposed between adjacent sections of the window and provided with portions that lap over said sections.

WILLIAM D. CROWELL.